US009253820B2

(12) United States Patent
Yang et al.

(10) Patent No.: US 9,253,820 B2
(45) Date of Patent: Feb. 2, 2016

(54) METHOD AND SYSTEM FOR IMPLEMENTING MULTIMEDIA CALL

(75) Inventors: Zhengrong Yang, Shenzhen (CN); Jianjun Zhu, Shenzhen (CN)

(73) Assignee: ZTE CORPORATION, Guangdong Province (CN)

( * ) Notice: Subject to any disclaimer, the term of this patent is extended or adjusted under 35 U.S.C. 154(b) by 54 days.

(21) Appl. No.: 14/364,052

(22) PCT Filed: Mar. 29, 2012

(86) PCT No.: PCT/CN2012/073262
§ 371 (c)(1),
(2), (4) Date: Jun. 9, 2014

(87) PCT Pub. No.: WO2012/152152
PCT Pub. Date: Nov. 15, 2012

(65) Prior Publication Data
US 2014/0321417 A1    Oct. 30, 2014

(30) Foreign Application Priority Data

Dec. 9, 2011 (CN) .......................... 2011 1 0409707

(51) Int. Cl.
*H04L 12/66* (2006.01)
*H04W 92/02* (2009.01)
(Continued)

(52) U.S. Cl.
CPC ........... *H04W 92/02* (2013.01); *H04L 12/1492* (2013.01); *H04L 65/1046* (2013.01);
(Continued)

(58) Field of Classification Search
USPC ........................................................ 709/203
See application file for complete search history.

(56) References Cited

U.S. PATENT DOCUMENTS 6,775,273 B1 * 8/2004 Kung ...................... H04L 29/06
370/356
6,973,309 B1 * 12/2005 Rygula .................. H04L 12/14
370/338
(Continued)

FOREIGN PATENT DOCUMENTS

| CN | 1567848 A | 1/2005 |
| CN | 1638337 A | 7/2005 |
| CN | 101047745 A | 10/2007 |

OTHER PUBLICATIONS

Notification of Transmittal of the International Search Report (PCT/ISA/210) for PCT/CN2012/073262 dated Jun. 21, 2012.

*Primary Examiner* — Duc C Ho
(74) *Attorney, Agent, or Firm* — Koppel, Parick, Heybl & Philpott

(57) ABSTRACT

A method and system for implementing a multimedia call are provided. The method includes: after receiving a calling request from a VoIP client, a calling controller transmitting the calling request to an application server; the application server acquiring rate options of calling respective called numbers by the VoIP client and returning the rate options to the calling controller, wherein the respective called numbers comprise one or multiple numbers registered by and/or bound with a called party of the calling request; the calling controller transmitting the rate options to the VoIP client, and suspending call handling of the calling request; and, after receiving a rate option selected by the VoIP terminal among the rate options, the calling controller transmitting the rate option selected by the VoIP terminal to the application server, resuming the call handling, and connecting a call between the VoIP client and a called terminal of a called number corresponding to the rate option selected. The disclosure shows the rate of the call before connecting the call, thereby improving user experience.

20 Claims, 8 Drawing Sheets

(51) Int. Cl.
   *H04L 29/06* (2006.01)
   *H04L 12/14* (2006.01)
   *H04L 29/08* (2006.01)
   *H04W 72/04* (2009.01)
   *H04M 15/00* (2006.01)

(52) U.S. Cl.
   CPC ........ *H04L65/1063* (2013.01); *H04L 65/1069* (2013.01); *H04L 67/14* (2013.01); *H04L 67/141* (2013.01); *H04M 15/56* (2013.01); *H04M 15/63* (2013.01); *H04M 15/83* (2013.01); *H04M 15/8351* (2013.01); *H04M 15/851* (2013.01); *H04W 72/0406* (2013.01); *H04L 12/1421* (2013.01)

(56) References Cited

U.S. PATENT DOCUMENTS

2008/0293403 A1* 11/2008 Quon .................... H04L 12/581
                                                                   455/426.1
2009/0003310 A1   1/2009 Kadel

* cited by examiner

METHOD AND SYSTEM FOR IMPLEMENTING MULTIMEDIA CALL

TECHNICAL FIELD

The disclosure relates to the field of communications, and in particular to a method and system for implementing a multimedia call.

BACKGROUND

In the current technical evolution to the next generation network (NGN), a plurality of means, such as softswitch, IP multimedia core network subsystem (IMS), H.323, session initiation protocol (SIP) server, can be used to implement the interaction of multimedia information such as voices, videos or even short messages over packet networks such as an Internet protocol (IP) and conventional telephone switch networks such as a public switched telephone network (PSTN). The trend of replacing time division multiplex (TDM) with IP has already been determined, and has been widely applied. Compared to the conventional circuit-based voice technique, voice over IP (VoIP) does not only have low costs, but the quality of voice has been significantly improved with the increase of bandwidth; in addition, various multimedia applications based on IP enables the VoIP to have a very strong attraction.

In another aspect, the progress of the broadband technique is changing with each passing day in recent years. In the wired aspect, the broadband technique is changing from the asymmetrical digital subscriber line (ASDL) to the very high data rate DSL (VDSL) to various passive optical networks (PON) (xPON); and in the wireless aspect, the broadband technique is changing from the general packet radio service (GPRS) to the HSPDA to the worldwide interoperability for microwave access (Wimax) to the long term evolution (LTE). With the increase of bandwidth, multimedia services are borne with higher and higher proficiency. In these wireless access techniques, the maturity of the wireless fidelity (WiFi) technique and the large deployment of WiFi access points (AP) enable free or concessional access to the Internet in family/enterprise/hotspot regions to enjoy high-speed Internet surfing. In particular, with the popularity of products such as APPLE iPhone and iPad, the mobile broadband has an explosive growth, and WiFi plays a more and more important role due to its high speed and free of charge.

Numerous Internet service providers (ISP) have developed various soft terminals and provide subscribers with services of IM, PRESENCE and VoIP, such as MSN, Skype. Most of these terminals are PC-based, and in particular, for real-time services such as voice, services such as computer-computer (PC-PC) free calling and computer-telephone (PC-PHONE) pre-charged calling may be provided for registered subscribers, thereby saving the call expense of the subscribers. For the clients of a PC version, the biggest disadvantage is that the operation is relatively inconvenient. Generally, a normal subscriber will not carry a PC or a notebook computer, and VoIP cannot be used without these; even if the subscriber carries a PC or a notebook computer, he/she needs to turn on the computer, enter the operating system, operate the soft terminal, input the account and password, and then input a called number, and thus the call can be implemented. Compared to mobile phone terminals and fixed-line telephones, it has the defects of inconvenient use and complicated operation process.

Some providers and device manufacturers are also formulating RCS and RCS-e and unifying specifications and requirements on software installed on mobile phones, so as to enhance intercommunity. However, as regards RCS-e, it is mainly concentrated on specifications of non-real-time services such as IM and file transmission, while as regards real-time services such as voice and short messages, they are explicitly required to go over conventional domains. Some mobile phone clients, due to the limit of wireless bandwidth, mainly provide non-real-time services such as IM chatting, file/picture transmission, and social networking, but do not include real-time services such as voice/videos.

Some device manufacturers directly design and manufacture specified hardware terminals supporting WiFi or other high-speed wireless bearer techniques, and pre-installed with corresponding software clients so as to support corresponding real-time and non-real-time services. However, in one aspect, the subscriber needs to carry one more specified customized mobile phone terminal supporting WiFi besides the current existing mobile phone (supporting GSM, WCDMA, CDMA or CDMA2000, TD-SCDMA or subsequent techniques); in another aspect, because of the development and numerous and abundant applications of the current Apple iOS and Android smart phone systems, such customized terminal is pale by comparison due to the lack of other services.

Some terminals with mobile phone clients also provide real-time services such as VoIP. However, some terminals can only provide PC-PC or PC-PHONE calling, and it needs to occupy wireless PS bandwidth such as GPRS, EDGE, HSPDA, and the quality of voice cannot be guaranteed, and the subscriber still needs to pay a large amount of PS bandwidth fees; some terminals can support social networking services such as IM and PRESENCE, but it needs to constantly query and update states of friends, and thus consuming a large amount of bandwidth, especially under PS such as GPRS, EDGE and HSPDA; some clients support social networking services such as IM and PRESENCE, however, with regards to a VoIP call, the subscriber can only select a PC account of a called friend subscriber as the called party, but cannot associate with a mobile phone number, a home number or a working number thereof and then connect same.

Some clients supporting social networking services such as IM and PRESENCE may associate multiple subscriber numbers, such as a mobile number and a fixed number, of a client with each other at the same time, such that when this account is called, simultaneous ringing or sequential ringing can be performed so as to perform connecting. However, as regards sequential ringing, in an extreme case, the connecting time will be very long which affects the experience of the caller side subscriber; meanwhile, since the called number is indefinite, the caller side subscriber does not clearly know which called number (mobile or fixed number) is really connected, and thus the fees may be different, which affects the financial experience of the caller side. At last, as regards providers, whether simultaneous ringing or sequential ringing, the connection is implemented by means of calling attempt, which will occupy a large number of resources for calling attempt, and the more the bound numbers are, the more the occupation is, and the less the economic is. Some clients are operated by means of pre-charging, etc.; however, the subscriber cannot learn the rate before the call is connected, but the continuous fee deduction is displayed during the call; therefore, the right of selecting a rate for calling the called subscriber is not provided for the subscriber.

With regards to the problem that a calling subscriber cannot learn or select a rate of calling the called subscriber before the call is connected in the related art, there is still not effective solution proposed now.

SUMMARY

With regards to the problem that a calling subscriber cannot learn or select a rate for calling the called subscriber before the call is connected in the related art, the embodiments of the disclosure provide a solution for implementing a multimedia call, so as to at least solve the above-mentioned problem.

According to an embodiment of the disclosure, a method for implementing a multimedia call is provided, including: after receiving a calling request from a Voice over Internet Protocol (VoIP) client, a calling controller transmitting the calling request to an application server; the application server acquiring rate options of calling respective called numbers by the VoIP client and returning the rate options to the calling controller, wherein the respective called numbers include one or multiple numbers registered by and/or bound with a called party of the calling request; the calling controller transmitting the rate options to the VoIP client, and suspending call handling of the calling request; and after receiving a rate option selected by the VoIP client among the rate options, the calling controller transmitting the rate option selected by the VoIP client to the application server, resuming the call handling, and connecting a call between the VoIP client and a called terminal of a called number corresponding to the rate option selected.

Preferably, before the calling controller receives the calling request from the VoIP client, the method further includes: a first gateway receiving the calling request transmitted by the VoIP client, wherein the VoIP client accesses the Internet via a high-speed wireless access network, and the first gateway is a gateway to which the VoIP client belongs; and the first gateway performing signalling conversion on the calling request of the VoIP client, and transmitting to the calling controller the converted calling request of the VoIP client.

Preferably, the application server acquiring the rate options of calling the respective called numbers by the VoIP client and returning the rate options to the calling controller includes: the application server determining that the called party of the calling request has one or multiple callable numbers, acquiring, from an accounting server, rate information of calling respective numbers of the one or multiple numbers by the VoIP client, and transmitting the respective rate options corresponding to the one or multiple numbers to the calling controller.

Preferably, the application server acquiring, from the accounting server, the rate information of calling respective numbers of the one or multiple numbers by the VoIP client includes: the application server transmitting a rate query request to the accounting server; after the accounting server receives the rate query request, respectively calculating the rate information of calling each number of the one or multiple numbers by the VoIP client, and transmitting the rate information obtained through calculation to the application server; and the application server receiving the rate information transmitted by the accounting server.

Preferably, after the calling controller transmits the rate option selected by the VoIP client to the application server, the method further includes: the application server transmitting a connecting request to the calling controller.

Preferably, the calling controller connecting the call between the VoIP client and the called terminal of the called number corresponding to the rate option selected includes: the calling controller transmitting the connecting request to a second gateway, wherein the second gateway is a gateway to which the called number selected by the VoIP client belongs; and the second gateway calling the called terminal corresponding to the called number selected by the VoIP client.

Preferably, after the second gateway calls the VoIP client and the called terminal corresponding to the called number selected by the VoIP client, the method further includes: the calling controller receiving a response message returned by the called terminal, and forwarding the response message to the application server; the calling controller receiving a call message returned by the application server, wherein the call message carries rate information of the current call of the VoIP client; and the calling controller returning the call message to the VoIP client, receiving a call confirmation message returned by the VoIP client, and forwarding the call confirmation message to the application server to instruct to perform accounting on the current call.

Preferably, before the current call ends, the method further includes: the calling controller transmitting a hang-up message to the application server; the calling controller receiving fee information of the current call of the VoIP client which is transmitted by the application server; and the calling controller transmitting the fee information to the VoIP client, and releasing the current call of the VoIP client.

Preferably, information of each called number acquired from the application server by the calling controller further includes: call quality information corresponding to each called number.

Preferably, the VoIP client is located in a PC or a mobile terminal.

According to another embodiment of the disclosure, a system for implementing a multimedia call is provided, including: a Voice over Internet Protocol (VoIP) client, a calling controller and an application server, wherein the VoIP client is configured to transmit a calling request, and select a rate option of a current call according to rate options of calling respective called numbers returned by the calling controller, wherein the respective called numbers include one or multiple numbers registered by and/or bound with a called party of the calling request; the calling controller is configured to receive the calling request from the VoIP client, acquire the rate options of calling respective called numbers by the VoIP client from the application server, and suspend call handling of the calling request after acquiring the rate options, and transmitting the acquired rate options to the VoIP client; and after receiving a rate option selected by the VoIP client from the rate options of calling respective called numbers, connect a call between the VoIP client and a called terminal of a called number of the rate option selected; and the application server is configured to return rate options of calling respective called numbers to the calling controller, wherein the rate options record rate information of calling respective called numbers by the VoIP client.

Preferably, the system further includes: a first gateway, configured to receive the calling request transmitted by the VoIP client, perform signalling conversion on the calling request of the VoIP client, and transmit the converted calling request of the VoIP client to the calling controller, wherein the VoIP client accesses the Internet via a high-speed wireless access network, and the first gateway is a gateway to which the VoIP client belongs.

Preferably, the system further includes: an accounting server; the application server is configured to transmit a rate query request to the accounting server, and receive the rate information of calling each number of the one or multiple numbers by the VoIP client which is returned by the accounting server; and the accounting server is configured to respectively calculate the rate information of calling each number of the one or multiple numbers by the VoIP client, and transmit the rate information obtained through calculation to the application server.

Preferably, the system further includes: a second gateway to which the called number corresponding to the rate option selected by the VoIP client belongs; the calling controller is configured to transmit a connecting request to the second gateway; and the second gateway is configured to call the VoIP client and the called terminal corresponding to the called number selected by the VoIP client.

Preferably, the VoIP client is located in a PC or a mobile terminal.

According to still another aspect of the disclosure, an application server is provided, including: a storage module, configured to store an association relationship of one or multiple callable numbers registered by a same subscriber; a receiving module, configured to receive a calling request from a calling controller, wherein the calling request carries a calling party identification and a called party identification; a query module, configured to query the association relationship, and acquire one or multiple numbers associated with the called party identification; an acquisition module, configured to acquire rate information of calling the one or multiple numbers acquired by the query module by a terminal corresponding to the calling party identification; and a transmission module, configured to transmit the rate information acquired by the acquisition module to the calling controller.

Preferably, the receiving module is further configured to receive a response request forwarded by the calling controller, wherein the response request carries a rate option selected by a calling party from the rate information; and the transmission module is further configured to transmit a connecting request to the calling controller to request the calling controller to connect the call between the terminal corresponding to the calling party identification and a called terminal of the called number corresponding to the rate option selected.

Preferably, the receiving module is further configured to receive a hang-up message from the calling controller; the acquisition module is further configured to acquire fee of the current call; and the transmission module is further configured to transmit the fee of the current call to the calling controller, so that the calling controller transmits the fee of the current call to the terminal corresponding to the calling party identification.

Preferably, the application server further includes: a management module, configured to manage the association relationship stored in the storage module, and provide a routine maintenance interface; and a business and accounting module, configured to output subscriber bill and call ticket information, and dock with a business and accounting financial system to accomplish reliable and credible recharge and refund operations.

By means of the disclosure, when a VoIP client calls, an application server acquires rate information of calling each called number of a called terminal by the VoIP client, and transmits the rate information to the VoIP client before connecting the called terminal, and after the VoIP client receives the rate information of each called number of the current call and selects an appropriate rate option according to the rate information, a calling controller connects the call between the VoIP client and the called terminal of the called number corresponding to the rate option selected. In this way, a subscriber can learn rate information about the call before the call is connected, which satisfies the requirement of a subscriber on the rate, and improves the user experience of a multimedia call.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

The embodiments of the disclosure relate to a method, device and system for implementing a multimedia call. A subscriber may use a VoIP client to initiate a call; before connecting the call, the client will display rates of the current call; and after the subscriber selects an appropriate rate option, the subsequent connecting is accomplished by a multimedia call system. The VoIP client may be a PC-based software program, and may be a program operated on a customized mobile terminal, and preferably may be an application operated on a smart mobile terminal, which may be freely downloaded from Apple Store or Android Market or application stores based on other smart mobile terminal operating systems. The VoIP client in the embodiments of the disclosure may support WiFi or other high-speed wireless network techniques (such as unlicensed mobile access (UMA), WiMax, LTE or even LTE-A), etc., and when these wireless signals exist, a subscriber may implement real-time multimedia call services such as voice, videos and short messages via these wireless bearer networks.

Figure 1:
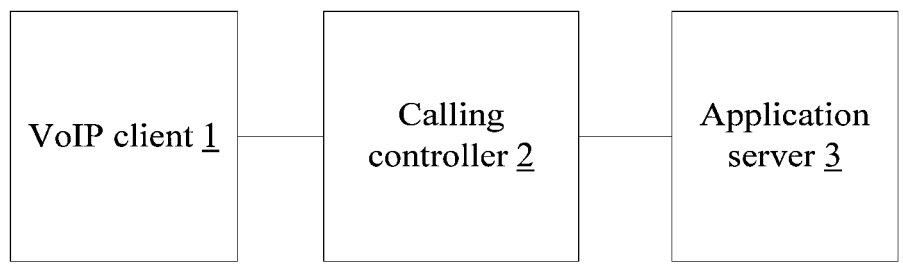
FIG. 1 is a schematic diagram of a system for implementing a multimedia call according to an embodiment of the disclosure.

According to an embodiment of the disclosure, a system for implementing a multimedia call is provided. As shown in FIG. 1, the system may include: a VoIP client 1, a calling controller 2 and an application server 3. The VoIP client 1 is configured to transmit a calling request, and select a rate option of the current call according to received rate options of calling respective called numbers returned by the calling controller 2, wherein the respective called numbers include one or multiple numbers registered by and/or bound with the called party of the calling request; the calling controller 2 is configured to receive the calling request from the VoIP client 1, acquire the rate options of calling respective called numbers by the VoIP client 1 from the application server 3, suspend call handling of the calling request after acquiring the rate options, and transmit the acquired rate options to the VoIP client 1; and after receiving a rate option selected by the VoIP client 1 from the rate options of calling respective called numbers, connect the call between the VoIP client 1 and the called terminal of the called number corresponding to the rate option selected; and the application server 3 is configured to return respective rate options corresponding to each called number to the calling controller 2, wherein each number registered by and/or bound with the called party of the calling request corresponds to one rate option, and each rate option records rate information of calling each called number by the VoIP client 1.

Figure 2:
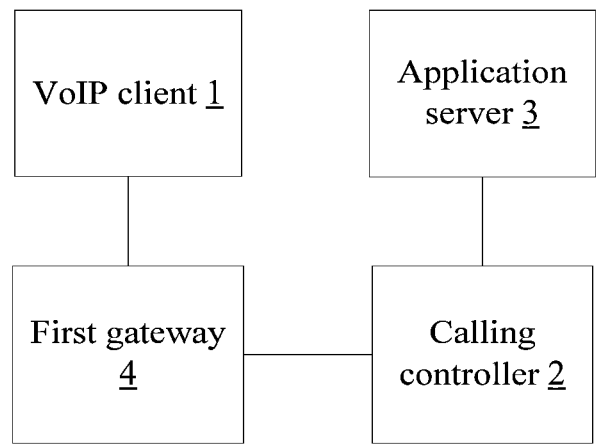
FIG. 2 is a schematic diagram of a first preferred system for implementing a multimedia call according to an embodiment of the disclosure.

In order to realize network topology isolation to guarantee the secure and stable operation of a core network, in a preferred implementation of the embodiments of the disclosure, as shown in FIG. 2, the system above may also include: a first gateway 4, configured to receive the calling request transmitted by the VoIP client 1, perform signalling conversion on the calling request from the VoIP client 1, and transmit the converted calling request of the VoIP client 1 to the calling controller 2, wherein the first gateway 4 is a gateway to which the VoIP client 1 belongs, and the VoIP client 1 accesses the Internet via a high-speed wireless access network, for example, the VoIP client may access the Internet via a free WiFi signal, or access the Internet via high-speed wireless networks such as UMA, WiMaX and LTE, and may also access the Internet via wired networks such as ADSL and VDSL. The VoIP client 1 initiates a call after accessing the Internet, and the first gateway 4 performs signalling conversion on the calling request from the VoIP client 1, and transmits the converted calling request of the VoIP client 1 to the calling controller 2. By means of the preferred embodiment, the core network of the present system may be isolated from the Internet and other networks, so as to guarantee the security and stability of the core network.

After receiving the calling request of the VoIP client 1, the calling controller 2 may acquire rate information of calling each called number by the VoIP client 1 from the application server 3. In a preferred implementation of the embodiments of the disclosure, the calling controller 2 may forward the calling request of the VoIP client 1 to the application server 3, and the application server 3 determines that the called party of the calling request has one or multiple callable numbers, acquires rate information of calling the one or multiple numbers above by the VoIP client 1, and returns acquired rate information to the calling controller 2; and the calling controller 2 receives the rate information returned by the application server 3, and returns the rate information corresponding to each called number to the VoIP client 1 in the form of rate options. By means of this preferred embodiment, the calling controller acquires rate information of calling one or multiple numbers of the called party by the VoIP client, thereby enabling the VoIP client to select an appropriate rate option according to the acquired rate information, enabling a subscriber to learn rate information about the call before connecting the call, and thus improving user experience.

Figure 3:
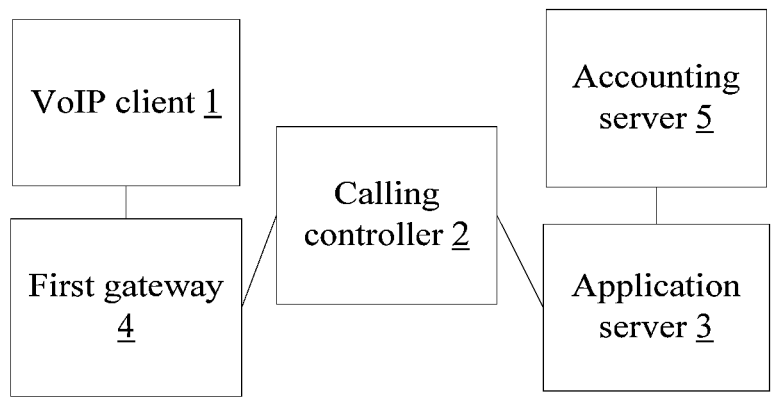
FIG. 3 is a schematic diagram of a second preferred system for implementing a multimedia call according to an embodiment of the disclosure.

In practical applications, the rate information of calling one or multiple numbers of the called party by the VoIP client 1 may be determined by the application server, and may also be determined by means of other independent network elements, for example, the rate information above may be calculated by means of an on-line accounting server. In order to calculate the rate information of calling the one or multiple numbers of the called party by the VoIP client, in a preferred implementation of the embodiments of the disclosure, as shown in FIG. 3, the system above may also include: an accounting server 5, coupled to the application server 3, and configured to calculate rate information of calling respective numbers of the one or multiple numbers of the called party by the VoIP client 1, and transmit the rate information above obtained through calculation to the application server 3. When the rate information needs to be acquired, the application server 3 is configured to transmit a rate query request to the accounting server 5, and receive the rate information of calling each number of the one or multiple numbers by the VoIP client 1 which is returned by the accounting server 5.

In view of the preferred embodiments above, the application server 3 may acquire the rate information of calling the one or multiple numbers of the called party by the VoIP client 1 in the following manner: after the application server 3 receives the calling request forwarded by the calling controller 3, the application server 3 transmits a rate query request to the accounting server 5; after the accounting server 5 receives the rate query request, the accounting server 5 respectively calculates the rate information of calling each number of the one or multiple numbers of the called party by the VoIP client 1, and transmits the rate information obtained through calculation to the application server 3; and the application server 3 receives the rate information transmitted by the accounting server 5. The application server 3 forwards the received rate information to the calling controller 2; the calling controller 2 transmits to the VoIP client 1 the rate information corresponding to respective called numbers in the form of rate options; and the VoIP client 1 selects a rate option of the current call according to the received rate options. By means of this preferred embodiment, since the calling controller 2 only returns to the VoIP client 1 the rate information of calling each number registered by and/or bound with the called party by the VoIP client 1, but not returns to the VoIP client 1 each number registered by and/or bound with the called party, the privacy of the called party may be protected while the caller may learn and select the current rate information at the same time.

The one or multiple numbers of the called party called by the VoIP client may belong to different networks, for example, the called party may be bounded with a VoIP service number, a mobile number, a fixed number, etc. when registering. In such case, the routes of the VoIP client 1 calling respective numbers are different, and thus the call qualities of calling respective numbers are different. In a preferred implementation of the embodiments of the disclosure, in order to meet the requirement of a subscriber on call quality, thereby enabling the subscriber to select a called number according to the call quality, the accounting server 5 may also perform statistics on call quality information about one or multiple numbers of the called party called by the VoIP client 1, and transmit the call quality information obtained through statistics to the application server 3; the application server 3 forwards the call quality information to the calling controller 2; the VoIP client 1 receives the call quality information forwarded by the calling controller 2; and the subscriber may select a called number of the current call according to rate information and call quality information of calling each number of the called party, which meets the requirements of the subscriber on the call quality and rate, thereby further improving user experience.

After selecting the called number of the current call according to the rate information and/or call quality information of calling each number of the called party, the VoIP client 1 transmits the selected called number to the calling controller. The calling controller receives the called number selected from each number of the called party by the VoIP client, and connects the call between the VoIP client and the called terminal corresponding to the selected called number. In a preferred implementation of the embodiments of the disclosure, before connecting the call between the VoIP client 1 and the called terminal corresponding to the selected called number, the calling controller 2 may also forward to the application server 3 the called number selected by the VoIP client 1, and after receiving the called number selected by the VoIP client 1, the application server 3 constructs a connecting request and transmits the constructed connecting request to the calling controller 2.

Figure 4:
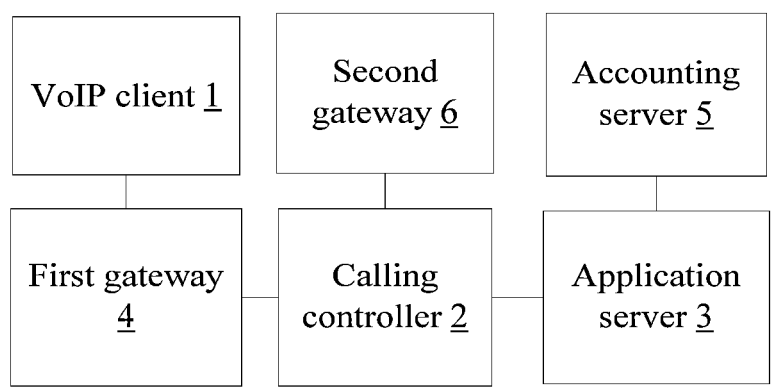
FIG. 4 is a schematic diagram of a third preferred system for implementing a multimedia call according to an embodiment of the disclosure.

After receiving the connecting request transmitted by the application server 3, the calling controller 2 transmits the connecting request to a gateway to which the called number selected by the VoIP client 1 belongs, and the gateway to which the called number belongs calls the called terminal corresponding to the called number selected by the VoIP client 1. In a preferred implementation of the embodiments of the disclosure, in order to perform network topology isolation and improve the security and stability of a core network, as shown in FIG. 4, the system above may also include: a second gateway 6 (i.e. a gateway to which the called number corresponding to the rate option selected by the VoIP client 1 belongs), configured to call the called terminal corresponding to the called number selected by the VoIP client 1. For example, when the called number selected by the VoIP client is a mobile number, the calling controller transmits the connecting request to a media gateway (MG) of a mobile network to which the called number belongs, and in this case, the second gateway is the media gateway. When the called number selected by the VoIP client is a VoIP number, the second gateway may be the same as the first gateway, i.e. the called number belongs to the gateway to which the VoIP client belongs (i.e. the first gateway).

After the called terminal corresponding to the called number answers the current call, a response message is transmitted to the calling controller 2, and the calling controller 2 receives the response message returned by the called terminal, and forwards the response message to the application server 3. After receiving the response message of the called terminal, the application server 3 may transmit to the calling controller 2 the rate information about the current call of the VoIP client 1, for example, by carrying the rate information about the current call in a call message to be transmitted to the calling controller 2, so that the VoIP client can confirm the rate of the current call, thereby meeting the requirement of a VoIP client subscriber on the rate, and improving user experience. The calling controller 2 returns the call message to the VoIP client 1; the VoIP client 1 returns a call confirmation message to the calling controller 2 after confirmation; and the calling controller 2 receives the call confirmation message returned by the VoIP client 1, and forwards the call confirmation message to the application server 3 to instruct to perform accounting on the current call.

When the VoIP client 1 or the called terminal hangs up to end the current call, a hang-up message may be transmitted to the calling controller 2. The calling controller 2 transmits the received hang-up message to the application server 3; after receiving the hang-up message, the application server 3 acquires fee information of the current call of the VoIP client 1 from the accounting server 5, and transmits to the calling controller 2 the fee information of the current call of the VoIP client 1; and the calling controller 2 forwards the fee information of the current call to the VoIP client 1, and releases the current call of the VoIP client 1. Preferably, the application server 3 may also update the balance of the VoIP client 1, and transmits the updated balance to the VoIP client 1. The VoIP client receives the fee information of the current call and the balance, and the subscriber may learn the fee of the call and the account balance immediately, thereby improving user experience.

By means of the embodiments of the disclosure, when a VoIP client calls, an application server acquires rate information of calling each called number of a called terminal by the VoIP client, and transmits the rate information to the VoIP client before connecting the called terminal, and after the VoIP client receives the rate information of calling each called number of the current call and selects an appropriate rate option according to the rate information, a calling controller connects the call between the VoIP client and the called terminal corresponding to the called number selected by the VoIP client. In this way, the subscriber can learn rate information of the call before the call is connected, which satisfies the requirement of the subscriber on the rate, and improves the user experience of a multimedia call.

According to an embodiment of the disclosure, a method for implementing a multimedia call is provided, which may be but not limited to be applied in the system for implementing a multimedia call provided in the embodiments of the disclosure above, thereby implementing a multimedia call.

Figure 5:
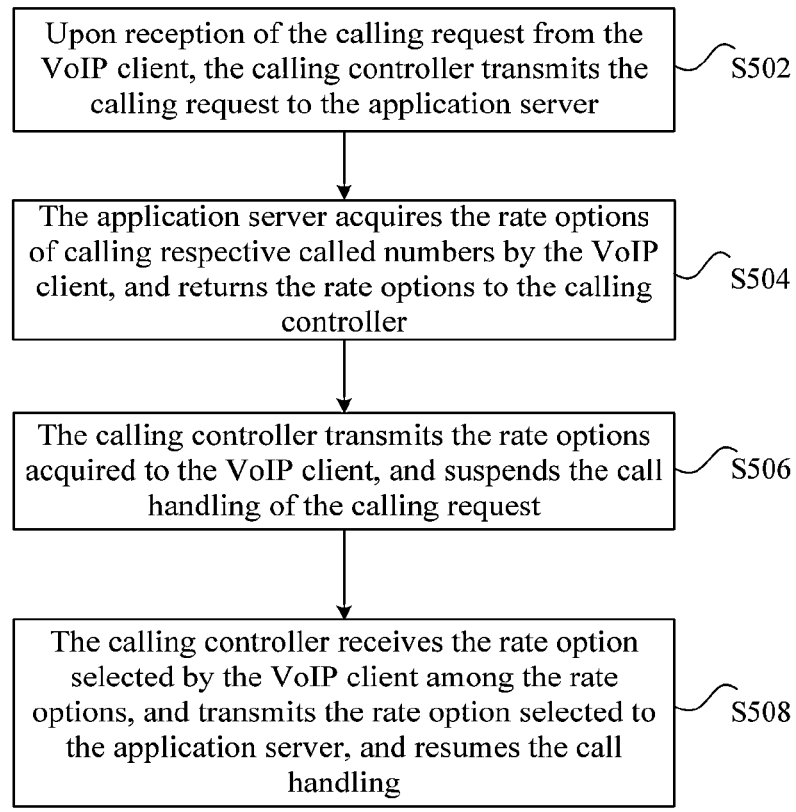
FIG. 5 is a flow chart of a method for implementing a multimedia call according to an embodiment of the disclosure.

FIG. 5 is a flow chart of a method for implementing a multimedia call according to an embodiment of the disclosure. As shown in FIG. 5, the method may include the following steps (step S502 to step S508).

Step S502, after receiving a calling request from a VoIP client, a calling controller transmits the calling request to an application server.

Step S504, the application server acquires rate options of calling respective called numbers by the VoIP client and returns the rate options to the calling controller, wherein the respective called numbers include one or multiple numbers registered by and/or bound with the called party of the calling request.

Step S506, the calling controller transmits the acquired rate options above to the VoIP client, and suspends call handling of the calling request.

Step S508, the calling controller receives a rate option selected by the VoIP client among the rate options, transmits the rate option selected to the application server, resumes the call handling, and connects the call between the VoIP client and the called terminal of the called number corresponding to the rate option selected.

By means of the embodiment of the disclosure, when a VoIP client initiates a multimedia call service, a calling controller acquires from an application server the rate information of calling each available called number of a called party by the VoIP client, and returns the acquired rate information to the VoIP client, and after the VoIP client receives the rate information, the subscriber selects an appropriate rate option according to the requirement on the rate, and the calling controller connects the call between the VoIP client and the called terminal of a called number corresponding to the rate option selected. In this way, the VoIP client can learn rate information about a call before the call is connected, can select appropriate rate information according to the rate information of each called number, which satisfies the requirement of a subscriber on the rate, and improves user experience.

Each of the steps mentioned above will be described in detail in the following:

(I) Step S502 to S504

A VoIP client 1 access the Internet via a high-speed wireless access network, for example, the VoIP client may access the Internet via a free WiFi signal, or access the Internet via high-speed wireless networks such as UMA, WiMax and LTE, and may also access the Internet via wired networks such as ADSL and VDSL. The VoIP client 1 may initiate a call after accessing the Internet, and the called numbers may be numbers of different networks such as a VoIP number, a mobile number and a fixed phone number. Preferably, when the VoIP client accesses the Internet via a free high-speed wireless network, the VoIP client can call other VoIP clients without any charge.

Figure 6:
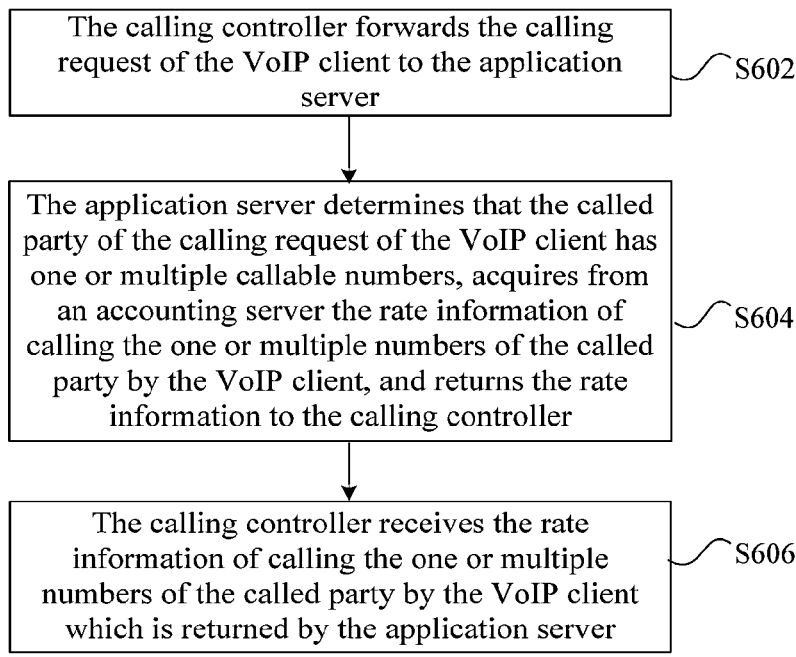
FIG. 6 is a flow chart of a method for a calling controller to acquire rate information according to an embodiment of the disclosure.

The VoIP client 1 transmits a calling request to a first gateway 4 (i.e. a gateway to which the VoIP client 1 belongs), and the first gateway 4 receives the calling request transmitted by the VoIP client 1, performs signalling conversion on the calling request received from the VoIP client 1, and transmits to a calling controller 2 the converted calling request of the VoIP client 1. After receiving the calling request of the VoIP client, the calling controller acquires from the application server the rate information of calling each called number by the VoIP client. In a preferred implementation of the embodiments of the disclosure, as shown in FIG. 6, the step that the calling controller 2 acquires from an application server 3 the rate information of calling each called number by the VoIP client may include the following several steps (step S602 to step S606).

Step S602, the calling controller forwards the calling request of the VoIP client to the application server.

Step S604, the application server determines that the called party of the calling request of the VoIP client has one or multiple callable numbers, acquires from an accounting server the rate information of calling the one or multiple numbers of the called party by the VoIP client, and returns the rate information to the calling controller.

In practical applications, the application server or other network elements may determine the rate information of calling the one or multiple numbers of the called party by the VoIP client, for example, an on-line accounting server may calculate the rate information above, and return the rate information obtained through calculation to the application server. In step S604 mentioned above, the application server may acquire from the accounting server the rate information of calling the one or multiple numbers of the called party by the VoIP client. In order to acquire the rate information of calling the one or multiple numbers of the called party by the VoIP client, the application server transmits a rate query request to the accounting server; after receiving the rate query request transmitted by the application server, the accounting server respectively calculates the rate information of calling each number of the one or multiple available numbers of the called party by the VoIP client, and transmits the rate information obtained through calculation to the application server; and the application server receives the rate information transmitted by the accounting server. Preferably, after receiving the rate query request, the accounting server may calculate, according to the VoIP client, the called number, and information about an access code or special identification input by a subscriber during a call and a VoIP client package, the rate information of calling each number of the one or multiple available numbers of the called party.

Step S606, the calling controller receives the rate information of calling the one or multiple numbers of the called party by the VoIP client which is returned by the application server.

In step S606 mentioned above, the multiple numbers of the called party called by the VoIP client may belong to different networks. In such a case, the routes of the VoIP client calling respective numbers are different, and thus the call qualities of calling respective numbers are different. In a preferred implementation of the embodiments of the disclosure, in order to meet the requirement of a subscriber on the call quality, thereby enabling the subscriber to select a called number according to the call quality, the information of each called number acquired by the calling controller from the application server may further include: call quality information corresponding to each called number. The subscriber may select a called number of the current call according to rate information and the call quality information about each number of the called party, which meets the requirements of the subscriber on the call quality and rate, thereby further improving user experience.

(II) Step S506

After receiving the rate information returned by the application server, the calling controller transmits the received rate information (preferably, it may be in the form of rate options) to a gateway to which the VoIP client belongs (i.e. the first gateway). After receiving respective rate options, the first gateway transmits respective rate options to the VoIP client. For example, the first gateway may transmit respective rate options to the VoIP client via the Internet and MODEM, WiFi AP. Multiple options will appear on the user interface of the VoIP client, and different rates (rate of each unit under free, concessional, normal and various cases) and relevant line prompting will appear in each option. In order to protect the privacy of the called party, the called number of each option may be not displayed. The subscriber selects an appropriate rate option according to rate information via the VoIP client; the VoIP client returns the rate option selected by the VoIP client to the first gateway; and the first gateway forwards to the calling controller the received rate option selected by the VoIP client.

After receiving the rate option selected by the VoIP client, the calling controller may forward to the application server the rate option selected by the VoIP client from various rate options. After receiving the rate option selected by the VoIP client, the application server transmits a connecting request to the calling controller. For example, when a called number corresponding to the rate option (for example, the free option mentioned above) selected by the VoIP client is a VoIP on-line called number, after the application server receives the rate option selected by the VoIP client, the application server analyses the received rate option, and determines that the VoIP client selects a VoIP on-line called number, and the current call is free. The application server takes the called number corresponding to the rate option selected by the VoIP client as the called number of the current call, and constructs a connecting request to the calling controller.

(III) Step S508

In a preferred implementation of the embodiments of the disclosure, connecting the call between the VoIP client and the called terminal of the called number corresponding to the rate option selected may include: the calling controller transmits a connecting request to a second gateway (i.e. a gateway to which the called number selected by the VoIP client belongs); and the second gateway calls a called terminal corresponding to the called number selected by the VoIP client.

For example, after receiving the connecting request, the calling controller analyses the called number selected by the VoIP client, and finds that the called number is a subscriber which has subscribed the VoIP service and is on-line. The calling controller transmits the connecting request to the second gateway (i.e. a gateway to which the called number belongs). In practical applications, the second gateway and the first gateway to which the VoIP client belongs may be the same boundary gateway. The second gateway passes the connecting request through the Internet, MODEM and WiFi AP and then finds a VoIP client corresponding to the called number. If the VoIP client corresponding to the called number is still on-line, ringing is performed. If the VoIP client corresponding to the called number is not on-line, a multimedia call system determines that the VoIP client corresponding to the called number cannot be connected by means of no response for timeout or by other means.

After the second gateway calls the VoIP client and the called terminal corresponding to the called number selected, the called terminal corresponding to the called number answers the current call; the called terminal may return a response message to the calling controller; the calling controller receives the response message returned by the called terminal, and forwards the response message to the application server; and after receiving the response message of the called terminal, the application server may return to the calling controller the rate information of the current call between the VoIP client and the called terminal. The calling controller receives a call message which carries the rate information of the current call of the VoIP client and is returned by the application server, and returns the call message to the VoIP client. After the VoIP client confirms, a call confirmation message is transmitted to the calling controller. The calling controller receives the call confirmation message returned by the VoIP client, and forwards the call confirmation message to the application server.

After receiving the call confirmation message, the application server instructs the accounting server to perform accounting on the current call. The application server may transmit an accounting start notification to the accounting server, and triggers the accounting server to start to perform accounting on the current call; the accounting server returns a confirmation message to the application server; and the application server turns the current call into a calling state, enters an accounting service state, and updates the balance of the account corresponding to the VoIP client.

For example, when a VoIP client corresponding to the called number selects to answer the call, the VoIP client generates a response message (such as 200 OK in an SIP protocol), and transmits the response message to the second gateway. The second gateway forwards the response message to the calling controller. The calling controller forwards the response message to the application server. The application server amends the state of the current call to a calling state. The application server transmits the call message together with the current rate to the VoIP client. The calling controller forwards the received call message to the first gateway, and the first gateway forwards the received call message to the VoIP client. After receiving the call message, the VoIP client enters a calling state, and at this moment, the two parties can communicate via the call, and at the same time the call confirmation message is returned to the first gateway. The first gateway returns the received call confirmation message to the calling controller. The calling controller returns the received call confirmation message to the application server. The application server transmits an accounting start notification to the accounting server.

When either party of the VoIP client and the called terminal hangs up, the current call between the VoIP client and the called terminal ends. The VoIP client transmits to the first gateway a hang-up message when hanging up, and correspondingly, if the called terminal hangs up, a hang-up message is transmitted to the gateway to which the called terminal belongs. After receiving the hang-up message, the first gateway forwards the hang-up message to the calling controller. The calling controller transmits the hang-up message to the application server, and after receiving the hang-up message, the application server determines fee information of the current call of the VoIP client, and transmits the determined fee information to the calling controller. After receiving the fee information of the current call of the VoIP client, the calling controller transmits the fee information to the VoIP client, and releases the current call of the VoIP client. After the VoIP client receives the fee information of the current call, the subscriber can learn fee information such as the fee of the current call and the account balance immediately, thereby improving user experience.

For example, when the call ends, the VoIP client transmits a hang-up message to the first gateway, and the first gateway forwards the hang-up message to the calling controller. The calling controller forwards the hang-up message to the application server, and the application server transmits an accounting stop message to the accounting server. After receiving the accounting stop message, the accounting server stops accounting for the current call between the VoIP client and the called terminal, and returns the fee of the current call to the application server. The application server performs balance update according to the fee of the current call, and notifies the calling controller to which the VoIP client belongs. At the same time, the application server turns the calling state of the call into a released state, and may generate a call ticket of the current call. The application server transmits a release complete message to the calling controller to which the VoIP client belongs, wherein the release complete message may carry information of the fee of the current call and the call balance. The calling controller to which the VoIP client belongs transmits the release complete message to the first gateway to which the VoIP client belongs, and the first gateway forwards the release complete message to the VoIP client. After displaying the fee of the current call and the balance, the VoIP client turns into an idle state.

After the application server transmits the release complete message to the calling controller to which the VoIP client belongs, the application server transmits the release complete message to the VoIP client corresponding to the called number. The calling controller to which the VoIP client corresponding to the called number belongs transmits the release complete message to the second gateway to which the VoIP client corresponding to the called number belongs; the second gateway forwards the release complete message to the VoIP client corresponding to the called number; and the VoIP client corresponding to the called number turns into an idle state.

Description will be made below through specific embodiments.

Embodiment I

The embodiment of the disclosure, taken as a specific implementation of the above-mentioned embodiments of the disclosure, provides an IP-based system and method for implementing a real-time multimedia call such as voice, videos and short messages.

Figure 7:
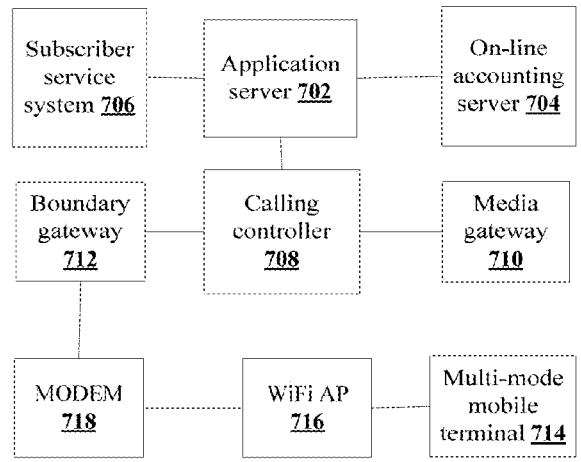
FIG. 7 is a schematic diagram of a multimedia call system according to embodiment I of the disclosure.

FIG. 7 is a schematic diagram of a multimedia call system according to embodiment I of the disclosure. As shown in FIG. 7, the system may include: at least one application server 702, at least one on-line accounting server 704, at least one subscriber service system 706, at least one calling controller 708, at least one media gateway 710, at least one boundary gateway 712, at least one multi-mode mobile terminal 714, at least one WiFi AP 716, and at least one MODEM 718.

The application server 702 is located in a core network of an operator and is coupled to the calling controller 708 and the on-line accounting server 704. Logically, the application server 702 is a database as well as a service application server, and is configured to manage subscriber account information, save account information and bound numbers of a registered client, save a tariff package subscribed by a subscriber and the current account balance, store and detect an on-line state of the subscriber, trigger on-line accounting for the initiated call, and exchange information with a VoIP client on a smart phone. Specifically, programs such as database retrieval and management, account number binding, client on-line state detection and maintaining, on-line accounting query triggering, balance query, recharge and refund, and changing a tariff package selected by a client may be installed on the application server for managing subscriber account information, wherein the programs may be stored in a corresponding storage space and memory.

The on-line charging server 704 is located in the core network of the operator and is coupled to the application server 702 for managing subscriber account information, and is configured to perform on-line accounting, manage a rate package, and query and settle the fee of the current call.

The subscriber service system 706 is located in the core network of the operator and is coupled to the application server 702 for managing subscriber account information, and is configured to recharge by means of a credit card or bank card of a client, inter-connect and inter-communicate with institutions such as UnionPay, VISA and MASTER, and provide a bill and call ticket query service for a subscriber, and push this information and other information to an e-mail provided by a client. Specifically, programs such as a client recharge and refund interface, call ticket and bill query and pushing sales promotion advertising to an e-mail may be installed on the subscriber service system, wherein the programs may be stored in a corresponding storage space and memory.

The calling controller 708 is located in the core network of the operator and is coupled (may be coupled through IP via a router) with the application server 702 for managing subscriber account information and the boundary gateway 712. The calling controller 708 may be a softswitch, may be an IMS, and may also be an SIP server or other calling controllers which may access a VoIP terminal, and is configured to implement access authentication and control of a subscriber account, trigger the application server 702 for managing account information upon an out-going call, and is configured to inter-communicate with other on-line accounts, PSTN/PLMN or other calling controllers. Specially, programs such as protocol adaptation supporting, registration authentication management, connecting from TDM to IP and service triggering may be installed on the calling controller, wherein the programs may be stored in a corresponding storage space and memory.

The media gateway 710 is located in the core network of the operator and is coupled to the calling controller 708, is configured to inter-communicate with networks such as a PSTN and PLMN, may provide the playing of necessary voice/signal tone, and may also provide some service assistance, such as fax control and transcoding. Specifically, programs such as voice encoding and decoding conversion, TDM relay resource and IP relay resource may be installed on the media gateway, wherein the programs may be stored in a corresponding storage space and memory.

The boundary gateway 712 is located between the core network of the operator and a home/enterprise/hotspot WLAN network, is coupled to the calling controller 708, and is indirectly coupled to a VoIP client operating on the multi-mode mobile terminal 714 by means of WiFi, etc. In practical applications, the core network of the operator can be controlled and managed, and thus can be trusted, while the home/enterprise/hotspot WLAN is a proprietary network, and cannot be trusted compared to the core network of the operator. Therefore, the boundary gateway 712 is configured to implement the signalling protocol and media traversing of the two networks and hide a core network topology from the multi-mode mobile terminal 714, is configured to perform access control so as to ensure the core network security, and is configured to provide QOS management so as to ensure the call quality of each subscriber, etc. Specifically, programs such as a corresponding route addressing, sub-network judgement and tunnel management function may be installed on the boundary gateway, wherein the programs may be stored in a corresponding storage space and memory.

The multi-mode mobile terminal 714 supports wireless broadband technique access such as WiFi and WiMAX, is located in a home/enterprise/hotspot WLAN network, the operating system may be APPLE iOS, and may be Android or Windows or other smart phone operating systems. The VoIP client software may be freely downloaded from AppStore or Android Market or other application stores, and is not conflicted with other existing applications. When the multi-mode mobile terminal 714 accesses the Internet, by means of the VoIP client, the multi-mode mobile terminal 714 may perform registration/log-in and calling in and calling out operations to the calling controller 708 and the application server 702 for managing subscriber account information via the boundary gateway 712. Or, a PC supporting WiFi (or wired broadband techniques such as an LAN, dedicated line, xPON or xDSL) access may operate the VoIP client software. Specifically, programs such as account registration, number binding, tariff display and selection, calling in and calling out response, and real-time display of call fee may be installed on a smart phone, wherein the programs may be stored in a corresponding storage space and memory of the smart phone.

The WiFi AP 716 is located in a home/enterprise/hotspot WLAN network and is coupled to the MODEM 718, may support a VoIP client of the multi-mode mobile terminal 714 to access the WLAN, thereby entering the Internet via the MODEM 718. If other wireless access techniques such as WiMAX or LTE are adopted, WiMAX AGW, LTE EPC etc. may be located in the core network of the operator. Specifically, a universal program may be installed on the WiFi AP to enable a VoIP signalling stream and media stream to smoothly access the boundary gateway and the calling controller via the WLAN and Internet.

The MODEM 718 is located in a home/enterprise/hotspot WLAN network, is coupled to the WiFi AP 716, and accesses the Internet with a high speed via access techniques such as a dedicated line, xDSL and xPON.

The method for implementing a multimedia call according to the embodiment of the disclosure at least includes processes of registration, number binding, calling out, calling in, etc., and description for the processes above will be made below respectively.

(I) The registration process includes the following steps.

Step A, a multi-mode mobile terminal supporting WiFi may download the VoIP client software from AppStore or Android Market or application stores of other smart phone operating systems; or, a PC may download the VoIP client software from a website.

Step B, when there is no WiFi signal, the VoIP client software on a smart phone may provide a prompt of "operation not suggested" to prompt a subscriber to still use a conventional circuit domain for calling (including short messages).

Step C, when there is a WiFi signal and the Internet is successfully accessed, the VoIP client software may be operated, and an e-mail address can serve as an account for initial registration. In the initial registration process, necessary information, such as a password for entering the account, may be input according to the prompt on the interface of the client software.

Step D, a system creates a temporary record in a subscriber service system and an application server for managing subscriber account information, transmits a mail requesting confirmation to the e-mail configured for the account, and sets the maximum time for waiting for confirmation. If the subscriber fails to confirm after expiration of the maximum time, the account will be configured as an inactive state, and the mail requesting confirmation will be transmitted again when the client logs in the next time.

Step E, after the client enters the e-mail box for confirmation, the client account is activated, and can be logged in successfully to perform other operations.

(II) The number binding process may include the following steps.

Step A, when the subscriber successfully logs in and uses the VoIP client for the first time, the VoIP client will enquiry a client whether to input a mobile number, and enquiry the client whether the system should allocate a telephone number (may be an E.164 number, and may also be an MSISDN) to be used when other subscribers call back the current client, and display a relevant charging policy of occupying a telephone number resource. If the client inputs a mobile number or needs a telephone number, this information will be transmitted, after confirmation, to the application server for managing subscriber account information.

Step B, after receiving this mobile number, the application server for managing subscriber account information temporarily saves and then verifies the mobile number.

Step C, the VoIP client should input these verification codes accurately, and these verification codes will be transmitted back to the system again for confirmation.

Step D, upon confirmation, the applications server for managing subscriber account information will formally associate this mobile number with the account. If the subscriber chooses to allocate a telephone number by the system, a telephone number is allocated according to the choice of the subscriber. If this allocated telephone number is charged, a subscriber service system is informed to perform a deduction operation on the relevant bank card.

Step E, the VoIP client software will also enquire other choices of the client, such as whether to bind other fixed network numbers or mobile numbers, whether to open a video service, whether to open a short message service, whether to open a calling party identifying service, whether to open a call diverting service, whether to open a short message notification service for missed calls, and these services may all involve some verification and charging processes.

(III) The log-in process includes the following several steps.

Step A, after inputting an account and password, the VoIP client transmits log-in signalling (such as REGISTER in SIP) to a system.

Step B, after receiving the signalling message, the boundary gateway accurately transmits the signalling to an appropriate calling controller for processing.

Step C, the calling controller judges whether the account and password of the VoIP client are correct, if so, notifies the application server for managing subscriber account information, and the account state is in an active state.

Step D, the application server for managing subscriber account information transmits account balance information to the VoIP client via the calling controller and the boundary gateway.

Step E, the VoIP client and the calling controller detects the on-line state periodically or based on calls, and notifies the application server for managing account information to update the on-line state.

(IV) The calling out process includes the following several steps.

Step A, the VoIP client logs in successfully, and after a called number is input to call this called number, it is firstly judged whether there is a reliable WiFi signal, if not, this request is directly refused and the subscriber is prompted to initiate a call via the existing network.

Step B, if the WiFi signal is reliable, the VoIP client judges whether the called number belongs to one of a certain member of the contact book of the current mobile phone. If so, a special access code is added prior to the called number, or it is identified in signalling (such as SIP), and this access code or identification will serve as one of the bases for judging a concessional rate in the system.

Step C, after receiving the signalling message, the boundary gateway accurately transmits the signalling to an appropriate calling controller for processing.

Step D, the calling controller parses the signalling, and triggers the application server for managing subscriber account information to process the signalling.

Step E, the application server for managing subscriber account information performs service processing on the called number. If the called number can be found in a subscriber account information database, it represents that the called party is also a subscriber of the current service, and then whether the subscriber is on-line is queried. If the subscriber is on-line, a free connecting prompt is transmitted to the subscriber, and at the same time, a tariff rate of the called number is queried from the on-line accounting server. If an access code or identification is carried, the on-line accounting server will use a concessional rate standard. After these queries are completed, the application server for managing subscriber account information transmits all rate information and information such as the account balance to the calling controller (for example, via messages of SUBSCRIBER or OPTION or INFO in SIP), and the calling controller transmits same to the VoIP client via the boundary gateway. For example, if a called subscriber B is also a subscriber of the current service and bound with C, D, E, etc. numbers, when a calling subscriber A calls the subscriber B, no matter whether the subscriber A calls the called number C, D or E, the called subscriber B can all be found in the application server for managing subscriber account information, and the state of B and the rates of C, D and E are queried so that the calling subscriber A can have a choice on the rate.

Step F, after the VoIP client displays these rates, the subscriber can perform selection. The selected option is transmitted to the application server for managing subscriber account information via the boundary gateway and the calling controller.

Step G, the application server for managing subscriber account information actively initiates a new call according to the selected option, and routing is performed via the calling controller. If the call is routed to a PSTN/PLMN, the signalling is out via the media gateway; and if the call is routed to another IP domain, the signalling may be out via the boundary gateway. If the called party answers, the application server for managing subscriber account information notifies the VoIP client to enter a bidirectional call state via the calling controller and the boundary gateway on one hand, and starts accounting on the other hand.

Step H, if either party of the calling party or called party hangs up, a release signal together with a media stream statistics report are transmitted via the calling controller to the application server for managing subscriber account information to stop accounting, and the fee of the current call and the latest balance are transmitted to the client.

(V) The calling in process is further divided into the following two different procedures.

1) If an account (i.e. the e-mail account) of the subscriber is called, the following steps are included.

Step A, the calling controller receives the signalling, and triggers the application server for managing subscriber account information.

Step B, the application server for managing subscriber account information queries whether the caller number is also a subscriber of the current service, if so, judges whether the called number is on-line, if it is on-line, connects the call, otherwise, refuses the call. In addition, depending on whether the called party chooses, when the called party is binding a number, to transmit a short message notification, it is determined whether to transmit a short message notification to the mobile phone corresponding to the called party so as to prompt the subscriber to go on-line and call back. If the caller number is not a number of the current service, whether the called number is on-line is judged; if so, the call is connected; and if not, whether to refuse the call is determined according to internal logic and operation policy.

2) If an allocated telephone number of the client is called, the following steps are included.

Step A, the calling controller receives the signalling, and triggers the application server for managing subscriber account information.

Step B, the application server for managing subscriber account information queries whether the caller number is also a subscriber of the current service, if so, judges whether the called number is on-line, if it is on-line, connects the call, otherwise, refuses the call. In addition, depending on whether the called party chooses, when the called party is binding a number, to transmit a short message notification, it is determined whether to transmit a short message notification to the mobile phone corresponding to the called party so as to prompt the subscriber to go on-line and call back. If the caller number is not a number of the current service, whether the called number is on-line is judged; if so, the call is connected; and if not, whether to refuse the call is determined according to internal logic and operation policy of the system.

By means of the embodiments of the disclosure, the VoIP client software downloaded via application stores of smart phones may be opened and used anywhere and at any time, avoiding complicated operations of a PC client. After a calling side calls a called number and before the call is formally connected, multiple rate options may be displayed so as to allow the subscriber to select a rate option, so that the calling party purposefully performs connection. Such an arrangement avoids phenomena of post-charging or pre-charging without prompting the rate in advance (only displaying the fee after the call starts and accounting starts) in the current call flow. Compared to the fact that other VoIP terminals may only realize the PC-PC or PC-PHONE mode, the VoIP client of the embodiments of the disclosure may support PHONE-IP (or so called PHONE-PC). Compared to the fact that other VoIP terminals pay attention to social networking functions such as IM and PRESENCE and frequently update and query friends' states, which occupies lots of bandwidth, and affect the number of accesses and the experience of each subscriber performing a real-time communication service even if a high-speed wireless broadband such as WiFi is used, the VoIP client of the embodiments of the disclosure provides a concessional rate for a friend subscriber, reduces the occupation of bandwidth to a greater degree, and increases the number of access clients.

Embodiment II

Figure 8:
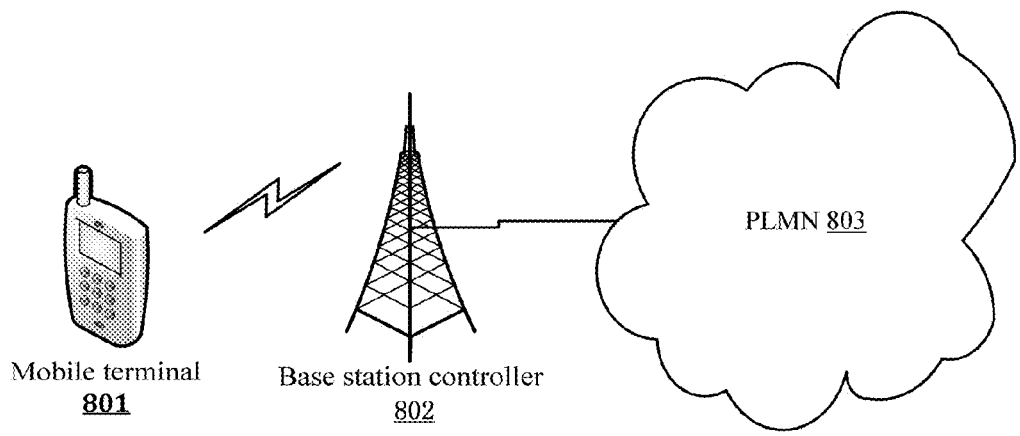
FIG. 8 is a schematic diagram showing a scenario where a mobile terminal accesses a network in the related art.

In the related art, as shown in FIG. 8, a mobile terminal 801 is coupled to a PLMN 803 via a base station controller 802, and completes call handling via a mobile switching centre (MSC), MSC server or MSCe, or a SGSN/GGSN (serving GPRS supporting node, SGSN), a gateway GPRS supporting node (GGSN), an MME/SAE (mobile management entity, MME) or system architecture evolution (SAE). The main problem of such a method is the relative high mobile network tariff, especially in the scenario of roaming and international roaming. While on the other hand, with the wide deployment of WiFi and the appearance of smart phones, it is possible to construct an IP-based VoIP call on a smart phone operating system. Therefore, according to an embodiment of the disclosure, a solution for implementing a multimedia call using a VoIP client to access a network via WiFi is provided.

Figure 9:
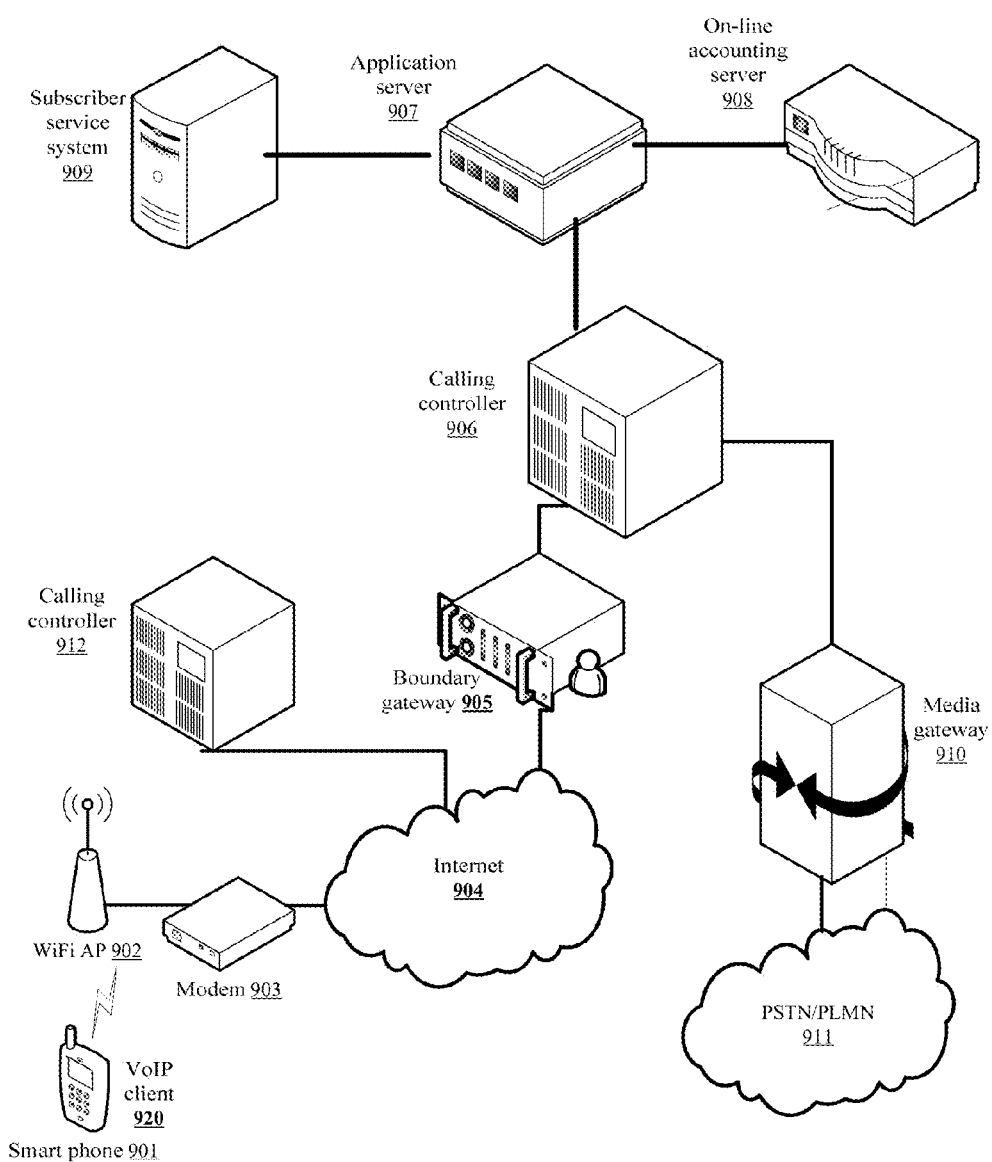
FIG. 9 is a schematic diagram of a system for implementing a multimedia call according to embodiment II of the disclosure.

FIG. 9 is a schematic diagram of a system for implementing a multimedia call according to embodiment II of the disclosure. As shown in FIG. 9, the system may include:

A smart phone 901, this may support GSM and WCDMA, and may also support CDMA and CDMA 2000, or a TD-SCDMA system. A WiFi access function is also provided at the same time. The smart phone 901 is a mobile phone installed with a smart phone operating system, such as popular Apple iOS, Android Market and Windows, and various applications may be downloaded from application stores thereof, and a multimedia call VoIP client 920 involved in the embodiments of the disclosure may also be included. This client automatically connects to a WiFi AP 902 after starting, and connects the Internet 904 via a modem (MODEM) 903, and the signalling will finally be transmitted to a calling controller 906 via a boundary gateway 905 so as to implement functions of binding numbers, calling out, selecting a rate, displaying a rate and fee, etc. If there is no WiFi signal or a WLAN cannot be connected, or the quality of voice is not good enough, the VoIP client 920 will not be used, and the call will still be performed by a traditional CS means.

A WiFi AP 902, this is a wireless access point of the smart phone, and the MODEM 903 can be normally connected even when only the WiFi signal exists, and the WiFi AP 902 allows the access of the VoIP client 920 of the smart phone 901, and thus the current service can be used. These access points may be located in home, office and public hotspot regions.

A MODEM 903, this may support the access to the Internet 904 by various means such as a dedicated line, xDSL and xPON. In some product series of some device manufacturers, the WiFi AP 902 and the MODEM 903 are products syncretic in hardware. In an embodiment of the present application, the MODEM 903 serves as a bearer channel together with the WiFi AP 902 to complete the transmission of signalling and media streams of the VoIP client 920.

A boundary gateway 905, its function is to perform network topology isolation, to protect the secure and stable operation of the core network such as a calling controller (106), an application server 907 for managing subscriber account information, an on-line accounting server 908, a subscriber service system 909 and other core network devices, such as a media gateway 910 and other calling controllers 912.

A calling controller 906, it may be a softswitch, IMS or SIP server, and it is responsible for the establishment of a call and the control and realization of service logic, responsible for triggering the calling out and calling in service of the VoIP client 920 to an application server 907 for managing subscriber account information, and responsible for the interaction between a PSTN/PLMN 911 with other calling controllers 912.

An application server 907 for managing subscriber account information, it is responsible for connecting to an on-line accounting server 908, a subscriber service system 909 and at least one calling controller 906, and providing service logic of a multimedia call: on-line state detection of a number, VoIP number and bound number database management, called number matching and selection, the prompt of rate information and final option receiving, selecting an appropriate called party to be connected, performing fee display and balance fee deduction, providing a call ticket of the current call, etc. In practical applications, it may also be divided into a dedicated database, an application server, a business and accounting interface machine, etc.

An on-line accounting server 908, it is used for configuring various rate packages, and querying and calculating the fee of the current call.

A subscriber service system 909, it may provide detailed call ticket query according to a subscriber requirement, may perform operations such as recharge and refund, may allow a subscriber to select a tariff package, and may push to the subscriber relevant tariff and activity information.

At least one media gateway 910, it completes signalling and media conversion between a TDM and IP, and is one of the most important network elements for connecting an IP-based multimedia call to a conventional PSTN/PLMN.

Figure 10:
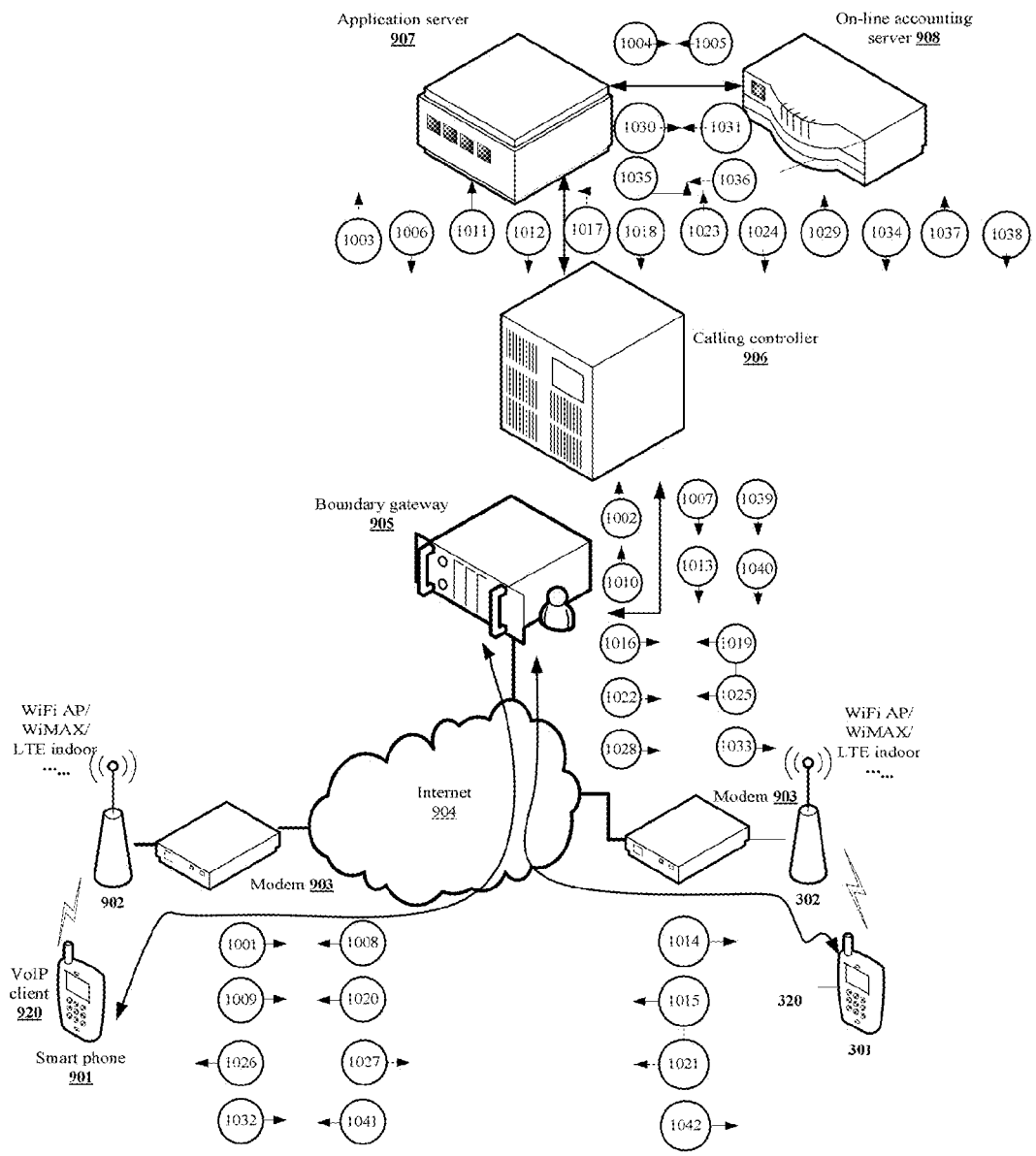
FIG. 10 is a flow chart of a method for implementing a multimedia call according to embodiment II of the disclosure.

FIG. 10 is a flow chart of a method for implementing a multimedia call according to Embodiment II of the disclosure. As shown in FIG. 10, the method may include the following steps.

Step S1001, when the VoIP client 920 successfully registers and needs to call another subscriber, the VoIP client 920 first transmits a request (such as INVITE in SIP) including a local end number, a called number and encoding and decoding allowed to be used, etc. If the called number belongs to one contact in the contact book of the smart phone 901 where the VoIP client 920 is located, an access code or special identification is included according to a subscriber option. This request will be connected to the Internet 904 via the WiFi AP 902 and MODEM 903 and then reach the boundary gateway 905.

Step S1002, after receiving the request, the boundary gateway 905 selects an appropriate signalling port and media stream port therefor and controls the bandwidth on one hand, and analyses the request, completes signalling conversion and forwards same to the calling controller 906 on the other hand.

Step S1003, after receiving the request, the calling controller 906 performs number analysis and finds that this request is a VoIP service, and triggers the application server 907 for managing subscriber account information.

Step S1004, after receiving the request, the application server 907 for managing subscriber account information performs analysis and finds an account corresponding to this number, if there is no balance or the account has expired, returns error, and if there is balance, analyses the called number. If the called number is also a client who subscribes the current service, the application server 907 finds all the bound numbers of the account through retrieval. If the request further includes an access code or special identification, it is taken into consideration together. The application server 907 transmits to the on-line accounting server 908 the information about a combination of these caller and bound numbers of a called party, time, date, tariff package used by the subscriber and the access code or special identification together, to query the rate of each called number.

Step S1005, the on-line accounting server 908 receives the query request, calculates the current rate according to information about the calling party and called party, date and time, access code or special identification, client package, etc., and even synthesizing others such as information about quality of voice of a route of the call, and returns same to the application server 907.

Step S1006, after receiving a rate instruction from the on-line accounting server 908, the application server 907 for managing subscriber account information transmits the rate of each called number (bound number), together with other information such as the account balance, the qualities of different routes, as a new request (such as SIP protocol, OPTION, or SUBSCRIBER or INFO, etc.) to the calling controller 906, and suspends the call handling to wait for a subscriber choice.

Step S1007, the calling controller 906 transmits the request to the boundary gateway 905.

Step S1008, the boundary gateway 905 transmits a rate request to the VoIP client 920 over a previously allocated signalling channel via the Internet 904, the MODEM 903 and the WiFi AP 902. At this moment, multiple options will appear on the user interface (UI) of the VoIP client 920, and different rates (rate of each unit under free, concessional, normal and various cases) and relevant line prompting will appear in each option. However, the called number of each option will be not displayed.

Step S1009, after seeing these options displayed on the screen of the smart phone 901, the VoIP client 920 performs selection. Since the called number is also on-line, the application server 907 for managing subscriber account information provides a free option, and also includes rates of other numbers (but not necessarily free). The subscriber selects this free option, and triggers a response. This response (it may be OPTION, INFO or NOTIFY if it is an SIP protocol) will be transmitted to the boundary gateway 905.

Step S1010, the boundary gateway 905 forwards the response request to the calling controller 906.

Step S1011, the calling controller 906 forwards the response request to the application server 907 for managing subscriber account information.

Step S1012, after receiving the response request, the application server 907 for managing subscriber account information performs analysis and learns that the client finally chooses to call an on-line called number and it is free. The application server 907 thus takes the selected number as a real called number, and constructs a connecting request to the calling controller 906.

Step S1013, after receiving the connecting request, the calling controller 906 analyses the called number, and finds that it is also a subscriber 920 which subscribes the service and it is on-line. The calling controller 906 transmits the connecting request to a boundary gateway to which a called subscriber 320 belongs (it is the boundary gateway 905 in the embodiment of the disclosure, and it may completely be a different boundary gateway in practical applications).

Step S1014, the boundary gateway 905 transmits the connecting request through the Internet 904, the MODEM 903 and the WiFi AP 902, and finds the VoIP client 920 finally operated on the smart phone 901, and if the VoIP 920 is still on-line, ringing is performed (in this step, it is assumed to be on-line, but if it is not on-line, or the client 920 is no longer operated, the system determines that the call cannot be connected by means of no response for timeout or by other means).

Step S1015, as long as the client 920 rings, negotiation of media encoding and decoding is performed, and the finally selected encoding and decoding is returned (if it is an SIP protocol, it may be an 18×message).

Step S1016, after receiving the ringing state prompt, the boundary gateway 905 configures a media stream port and uploads a signalling message to the calling controller 906.

Step S1017, the calling controller 906 transmits a ringing message to the application server 907 for managing subscriber account information.

Step S1018, the application server 907 amends the state of the call to a ringing state on one hand, and transmits the state to the caller side on the other hand.

Step S1019, the calling controller 906 forwards the ringing message to the caller side after receiving the ringing message.

Step S1020, the boundary gateway 905 continues to forward the ringing message to the VoIP client 920, and reserves the media stream port. At this moment, the client 920 may hear a ring-back tone or voice from the called side.

Step S1021, the VoIP client 920 chooses to answer, and at this moment, a response message (such as 200 OK in an SIP protocol) will be generated and then transmitted to the boundary gateway 905.

Step S1022, the boundary gateway 905 forwards the response message to the calling controller 906.

Step S1023, the calling controller 906 forwards the response message to the application server 907 for managing subscriber account information, and the application server 907 amends the state of the current call as a calling state.

Step S1024, the application server 907 for managing subscriber account information transmits a call message together with the current rate to the VoIP client 920 of the caller side.

Step S1025, the calling controller 906 forwards the received call message to the boundary gateway 905.

Step S1026, the boundary gateway 905 finally forwards the received call message to the VoIP client 920.

Step S1027, the VoIP client 920 also enters a calling state, and at this moment, the two parties may communicate. At the same time, a call confirmation message is returned to the system.

Step S1028, the boundary gateway 905 transmits the received call confirmation message back to the calling controller 906.

Step S1029, the calling controller 906 transmits the received call confirmation message back to the application server 907 for managing subscriber account information.

Step S1030, the application server 907 for managing subscriber account information transmits an accounting start notification to the on-line server 908 immediately.

Step S1031, the on-line accounting server 908 starts accounting, and returns a confirmation message to the application server 907 for managing subscriber account information. The application server 907 also turns the current call into a calling state, enters an accounting service state, and updates the balance.

Step S1032, once the call ends, the VoIP client 920 transmits a hang-up message, and transmits media stream information on which statistics is performed about the current call together to the boundary gateway 905.

Step S1033, the boundary gateway 905 forwards the hang-up message to the calling controller 906.

Step S1034, the calling controller 906 forwards the hang-up message to the application server 907 for managing subscriber account information.

Step S1035, the application server 907 for managing subscriber account information transmits an accounting stop message to the on-line accounting server 908 immediately.

Step S1036, after receiving the accounting stop message, the on-line accounting server 908 stops accounting, and returns the fee of the current call to the application server 907 for managing subscriber account information.

Step S1037, the application server 907 for managing subscriber account information performs balance update according to the fee of the current call, and notifies the calling controller 906 to which the VoIP client 920 at the caller side belongs. At the same time, the call is turned into a released state, and a call ticket of the current call may be generated (it is also allowed to generate a call ticket after the release of the called side is completed, which may have a certain time delay). The application server 907 transmits a release complete message to the calling controller 906 to which the caller side belongs, wherein the release complete message carries information about the fee of the current call and the call balance.

Step S1038, the application server 907 for managing subscriber account information transmits a release message to the calling controller 920 to which the VoIP client 920 of the called side belongs.

Step S1039, the calling controller 906 transmits the release complete message to the boundary gateway 905 to which the VoIP client 920 of the caller side belongs.

Step S1040, the calling controller 906 transmits the release message to the boundary gateway to which the VoIP client 920 of the called side belongs, which is the boundary gateway 905 in the embodiment of the disclosure.

Step S1041, the boundary gateway 905 forwards the release complete message to the VoIP client 920 of the caller side. After displaying the fee of the current call and the balance, the VoIP client 920 turns into an idle state.

Step S1042, the boundary gateway 905 forwards the release message to the VoIP client 320 of the called side to release the called party.

The steps mentioned above in the embodiment of the disclosure describe a processing flow when a called number subscribes a VoIP service. The called number of a VoIP call may also not subscribe a VoIP service or the VoIP client is not on-line, then the VoIP client may call a mobile number or fixed number of the called party according to a user choice. The cases of calling a mobile number and a fixed number are respectively described below.

(I) The case where the VoIP client calls a mobile number of the called party

The VoIP client calls a called subscriber, wherein the called subscriber does not subscribe the VoIP service, or the called subscriber subscribes the VoIP service but is not on-line currently, or the called subscriber is on-line but the subscriber still chooses other rates for connecting. In the case where the subscriber selects the mobile number of the called party as a called number, the called number will be connected into a mobile network corresponding to the called number via a media gateway of the mobile network corresponding to the called number, and finally a terminal corresponding to the called number is found via a relevant base station controller. In such case, the processing steps are similar to those in FIG. 10, and the difference lies in that the calling controller forwards the connecting request to a media gateway of a mobile network corresponding to the called number when connecting the called number, and in practical applications, the rates generated by the call may be different.

(II) The case where the VoIP client calls a fixed number of the called party

The VoIP client 920 calls a called subscriber, and what is different from the case mentioned above is that the calling subscriber finally selects a fixed number. The called number will be connected into a PSTN network via a media gateway, and finally a fixed terminal corresponding to the called number is found. The relevant steps are similar to those in FIG. 10, and the difference lies in that the calling controller forwards the connecting request to a media gateway of a PSTN network corresponding to the called number when connecting the called number, and in practical applications, the rates generated by the call may be different.

According to an embodiment of the disclosure, an application server is further provided, which may be used for acquiring rate information of the calling party/called party of a call, and acquiring call fee information after the call ends.

Figure 11:
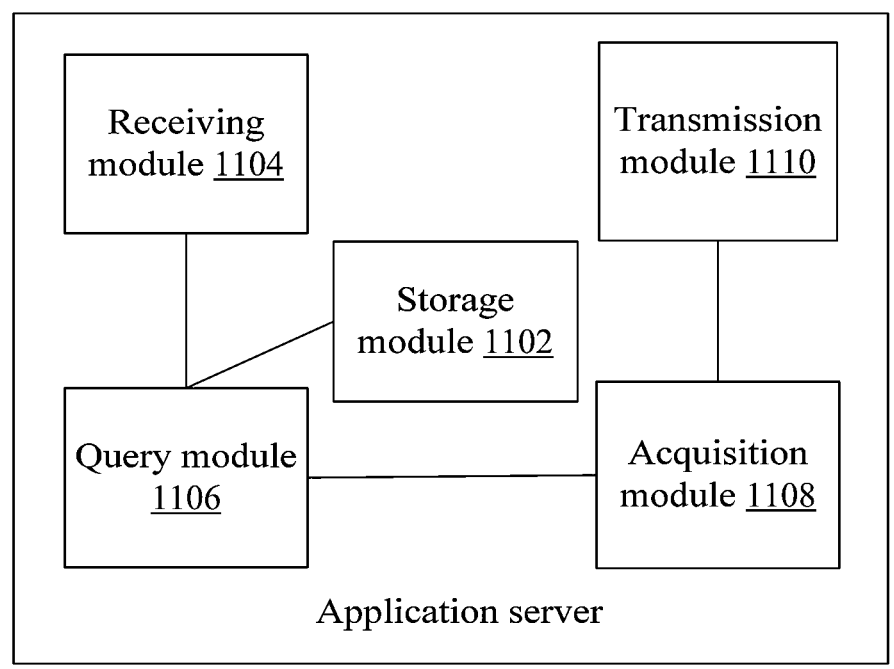
FIG. 11 is a structural block diagram of an application server according to an embodiment of the disclosure.

FIG. 11 is a structural block diagram of an application server according to an embodiment of the disclosure. As shown in FIG. 11, the application server may include: a storage module 1102, a receiving module 1104, a query module 1106, an acquisition module 1108 and a transmission module 1110. The storage module 1102 is configured to store an association relationship of one or multiple callable numbers registered by the same subscriber; the receiving module 1104 is configured to receive a calling request from a calling controller, wherein the calling request carries calling party identification and called party identification; the query module 1106 is configured to query the association relationship saved in the storage module 1102, and acquire one or multiple numbers associated with the called party identification; the acquisition module 1108 is configured to acquire rate information of calling the one or multiple numbers acquired by the query module 1106 by the terminal corresponding to the calling party identification; and the transmission module 1110 is configured to transmit the rate information acquired by the acquisition module 1108 to the calling controller.

After the transmission module 1110 of the application server transmits the acquired rate information to the calling controller, the calling controller forwards the rate information to the calling terminal, and the calling terminal selects one rate option from multiple pieces of rate information according to the rate information and transmits a response request to the calling controller, the response request carrying the rate option selected by the calling party from the one or multiple pieces of rate information. After receiving the response request, the calling controller forwards the response request to the application server, and the receiving module 1104 of the application server may also receive the response request forwarded by the calling controller. After the receiving module 1104 receives the response request, the transmission module 1110 of the application server is further configured to transmit a connecting request to the calling controller to request the calling controller to connect the call between the terminal corresponding to the calling party identification and the terminal corresponding to the selected called number.

In a preferred implementation of the embodiments of the disclosure, after a call ends, the receiving module 1104 may also receive a hang-up message from the calling controller; after receiving the hang-up message, the acquisition module 1108 may also acquire the fee of the current call; and the transmission module 1110 may transmit the fee of the current call to the calling controller, and the calling controller transmits the fee of the current call to the terminal corresponding to the calling party identification. By means of the preferred embodiment, the application server transmits the call fee information of a subscriber to the calling controller, and the calling controller forwards the call fee information to the subscriber, and thus the subscriber can immediately learn the call fee after the call ends, thereby improving user experience.

Figure 12:
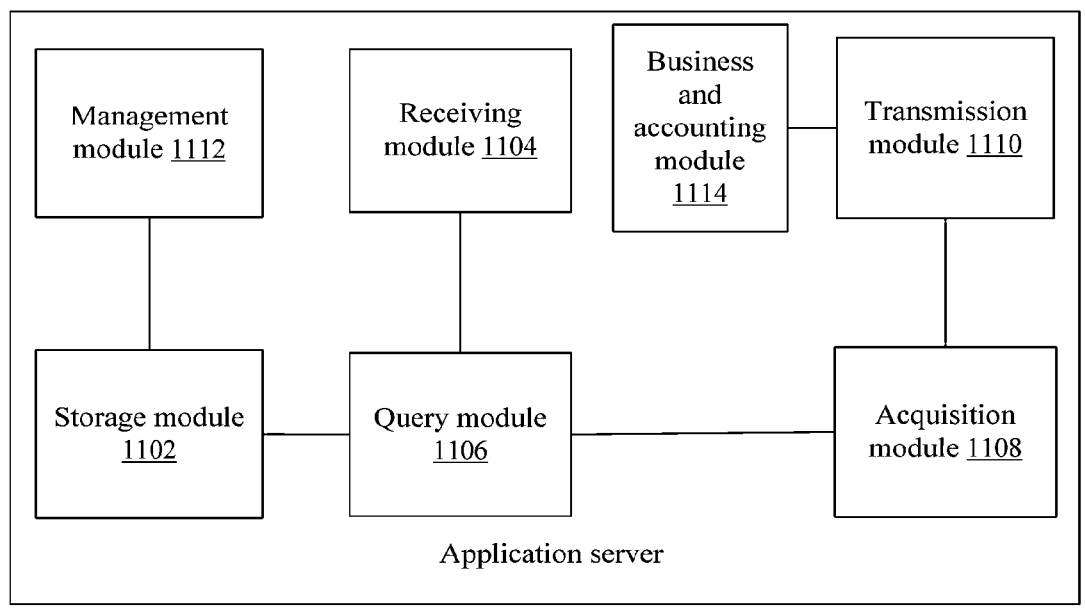
FIG. 12 is a structural block diagram of a preferred application server according to an embodiment of the disclosure.

In a preferred implementation of the embodiments of the disclosure, as shown in FIG. 12, the application server further includes: a management module 1112, configured to manage the association relationship stored in the storage module 1102, and to provide a routine maintenance interface; and a business and accounting module 1114, configured to output subscriber bill and call ticket information, and to dock with a business and accounting financial system so as to accomplish reliable and credible recharge and refund operations. In this embodiment of the disclosure, the application server is newly added to the existing system, and the normal operation of the entire subscriber business database can be ensured by means of the management module, and the application server may be maintained by means of the routine maintenance interface provided by the management module.

From the description above, it can be seen that the embodiments of the disclosure can realize the following technical effects: a subscriber may use a VoIP client to implement a call; rates of the current call will be displayed on the client before connecting; after the subscriber selects an appropriate rate option, a multimedia call system is used to complete subsequent connecting, thereby enabling the VoIP client to learn rate information of the call before the call is connected; and an appropriate called number may be selected according to rate information of each called number, which satisfies the requirement of a subscriber on the rate, and improves user experience. The VoIP client may be a PC-based software program, and may be a program operated on a customized mobile terminal, and may be an application operated on a smart mobile terminal, which may be freely downloaded from Apple Store or Android Market or application stores of other smart mobile terminal operating systems and may facilitate the use of a subscriber.

Obviously, those skilled in the art should know that each of the mentioned modules or steps of the disclosure can be realized by universal computing devices; the modules or steps can be focused on single computing device, or distributed on the network formed by multiple computing devices; selectively, they can be realized by the program codes which can be executed by the computing device; thereby, the modules or steps can be stored in the storage device and executed by the computing device; and under some circumstances, the shown or described steps can be executed in different orders, or can be independently manufactured as each integrated circuit module, or multiple modules or steps thereof can be manufactured to be single integrated circuit module, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any modification, equivalent replacement, or improvement made within the principle of the disclosure shall all fall within the protection scope as defined by the appended claims of the disclosure.

What is claimed is:

1. A method for implementing a multimedia call, comprising:
   after receiving a calling request from a Voice over Internet Protocol (VoIP) client, a calling controller transmitting the calling request to an application server;
   the application server acquiring rate options of calling respective called numbers by the VoIP client and returning the rate options to the calling controller, wherein the respective called numbers comprise one or multiple numbers registered by and/or bound with a called party of the calling request;
   the calling controller transmitting the rate options to the VoIP client, and suspending call handling of the calling request; and
   after receiving a rate option selected by the VoIP client among the rate options, the calling controller transmitting the rate option selected by the VoIP client to the application server, resuming the call handling, and connecting a call between the VoIP client and a called terminal of a called number corresponding to the rate option selected.

2. The method according to claim 1, wherein before the calling controller receives the calling request from the VoIP client, the method further comprises:
   a first gateway receiving the calling request transmitted by the VoIP client, wherein the VoIP client accesses the Internet via a high-speed wireless access network, and the first gateway is a gateway to which the VoIP client belongs; and
   the first gateway performing signalling conversion on the calling request of the VoIP client, and transmitting to the calling controller the converted calling request of the VoIP client.

3. The method according to claim 1, wherein the application server acquiring the rate options of calling the respective called numbers by the VoIP client and returning the rate options to the calling controller comprises:
   the application server determining that the called party of the calling request has one or multiple callable numbers, acquiring, from an accounting server, rate information of calling respective numbers of the one or multiple numbers by the VoIP client, and transmitting the respective rate options corresponding to the one or multiple numbers to the calling controller.

4. The method according to claim 3, wherein the application server acquiring, from the accounting server, the rate information of calling respective numbers of the one or multiple numbers by the VoIP client comprises:
   the application server transmitting a rate query request to the accounting server;
   after the accounting server receives the rate query request, respectively calculating the rate information of calling each number of the one or multiple numbers by the VoIP client, and transmitting the rate information obtained through calculation to the application server; and
   the application server receiving the rate information transmitted by the accounting server.

5. The method according to claim 1, wherein after the calling controller transmits the rate option selected by the VoIP client to the application server, the method further comprises: the application server transmitting a connecting request to the calling controller.

6. The method according to claim 5, wherein the calling controller connecting the call between the VoIP client and the called terminal of the called number corresponding to the rate option selected comprises:
   the calling controller transmitting the connecting request to a second gateway, wherein the second gateway is a gateway to which the called number selected by the VoIP client belongs; and
   the second gateway calling the called terminal corresponding to the called number selected by the VoIP client.

7. The method according to claim 6, wherein after the second gateway calls the VoIP client and the called terminal corresponding to the called number selected by the VoIP client, the method further comprises:
   the calling controller receiving a response message returned by the called terminal, and forwarding the response message to the application server;
   the calling controller receiving a call message returned by the application server, wherein the call message carries rate information of the current call of the VoIP client; and
   the calling controller returning the call message to the VoIP client, receiving a call confirmation message returned by the VoIP client, and forwarding the call confirmation message to the application server to instruct to perform accounting on the current call.

8. The method according to claim 7, wherein before the current call ends, the method further comprises:
   the calling controller transmitting a hang-up message to the application server;
   the calling controller receiving fee information of the current call of the VoIP client which is transmitted by the application server; and
   the calling controller transmitting the fee information to the VoIP client, and releasing the current call of the VoIP client.

9. The method according to claims 1, wherein information of each called number acquired from the application server by the calling controller further comprises: call quality information corresponding to each called number.

10. The method according to claim 1, wherein the VoIP client is located in a PC or a mobile terminal.

11. A system for implementing a multimedia call, comprising: a Voice over Internet Protocol (VoIP) client, a calling controller and an application server, wherein
   the VoIP client is configured to transmit a calling request, and select a rate option of a current call according to rate options of calling respective called numbers returned by the calling controller, wherein the respective called numbers comprise one or multiple numbers registered by and/or bound with a called party of the calling request;
   the calling controller is configured to receive the calling request from the VoIP client, acquire the rate options of calling respective called numbers by the VoIP client from the application server, and suspend call handling of the calling request after acquiring the rate options, and transmitting the acquired rate options to the VoIP client; and after receiving a rate option selected by the VoIP client from the rate options of calling respective called numbers, connect a call between the VoIP client and a called terminal of a called number of the rate option selected; and
   the application server is configured to return rate options of calling respective called numbers to the calling controller, wherein the rate options record rate information of calling respective called numbers by the VoIP client.

12. The system according to claim 11, further comprising:
a first gateway, configured to receive the calling request transmitted by the VoIP client, perform signalling conversion on the calling request of the VoIP client, and transmit the converted calling request of the VoIP client to the calling controller, wherein the VoIP client accesses the Internet via a high-speed wireless access network, and the first gateway is a gateway to which the VoIP client belongs.

13. The system according to claim 11, further comprising:
an accounting server;
the application server is configured to transmit a rate query request to the accounting server, and receive the rate information of calling each number of the one or multiple numbers by the VoIP client which is returned by the accounting server; and
the accounting server is configured to respectively calculate the rate information of calling each number of the one or multiple numbers by the VoIP client, and transmit the rate information obtained through calculation to the application server.

14. The system according to claim 11, further comprising:
a second gateway to which the called number corresponding to the rate option selected by the VoIP client belongs;
the calling controller is configured to transmit a connecting request to the second gateway; and
the second gateway is configured to call the VoIP client and the called terminal corresponding to the called number selected by the VoIP client.

15. The system according to claims 11, wherein the VoIP client is located in a PC or a mobile terminal.

16. An application server, comprising:
a storage module, configured to store an association relationship of one or multiple callable numbers registered by a same subscriber;
a receiving module, configured to receive a calling request from a calling controller, wherein the calling request carries a calling party identification and a called party identification;
a query module, configured to query the association relationship, and acquire one or multiple numbers associated with the called party identification;
an acquisition module, configured to acquire rate information of calling the one or multiple numbers acquired by the query module by a terminal corresponding to the calling party identification; and
a transmission module, configured to transmit the rate information acquired by the acquisition module to the calling controller.

17. The application server according to claim 16, wherein
the receiving module is further configured to receive a response request forwarded by the calling controller, wherein the response request carries a rate option selected by a calling party from the rate information; and
the transmission module is further configured to transmit a connecting request to the calling controller to request the calling controller to connect the call between the terminal corresponding to the calling party identification and a called terminal of the called number corresponding to the rate option selected.

18. The application server according to claim 17, wherein
the receiving module is further configured to receive a hang-up message from the calling controller;
the acquisition module is further configured to acquire fee of the current call; and
the transmission module is further configured to transmit the fee of the current call to the calling controller, so that the calling controller transmits the fee of the current call to the terminal corresponding to the calling party identification.

19. The application server according to claim 16, wherein
the receiving module is further configured to receive a hang-up message from the calling controller;
the acquisition module is further configured to acquire fee of the current call; and
the transmission module is further configured to transmit the fee of the current call to the calling controller, so that the calling controller transmits the fee of the current call to the terminal corresponding to the calling party identification.

20. The application server according to claim 16, further comprising:
a management module, configured to manage the association relationship stored in the storage module, and provide a routine maintenance interface; and
a business and accounting module, configured to output subscriber bill and call ticket information, and dock with a business and accounting financial system to accomplish reliable and credible recharge and refund operations.

* * * * *